United States Patent
Ross et al.

(10) Patent No.: US 8,007,216 B2
(45) Date of Patent: Aug. 30, 2011

(54) PLASTIC THREADED INSERT

(75) Inventors: Milton I. Ross, Wayne, PA (US); A. Jason Ross, Philadelphia, PA (US)

(73) Assignee: AJR Polytron, Inc., Huntingdon Valley, PA (US)

( * ) Notice: Subject to any disclaimer, the term of this patent is extended or adjusted under 35 U.S.C. 154(b) by 834 days.

(21) Appl. No.: 11/812,195

(22) Filed: Jun. 15, 2007

(65) Prior Publication Data

US 2008/0310934 A1      Dec. 18, 2008

(51) Int. Cl.
*F16B 37/08* (2006.01)
*B29C 65/08* (2006.01)

(52) U.S. Cl. .......................... 411/171; 411/82; 156/73.1

(58) Field of Classification Search .................. 411/171, 411/338, 182, 71, 73, 82
See application file for complete search history.

(56) References Cited

U.S. PATENT DOCUMENTS

| 2,120,577 | A | * | 6/1938 | Schulte | 411/71 |
|---|---|---|---|---|---|
| 3,280,875 | A | * | 10/1966 | Fischer | 411/180 |
| D223,231 | S | * | 4/1972 | Miller | D8/385 |
| 3,982,363 | A | * | 9/1976 | Dorris | 52/98 |
| 4,709,973 | A | * | 12/1987 | Waters et al. | 439/78 |
| 4,941,788 | A | * | 7/1990 | Highfield | 411/178 |
| 5,131,795 | A | * | 7/1992 | Kobusch | 411/178 |
| 5,672,036 | A | * | 9/1997 | Medal | 411/82 |
| 5,879,115 | A | * | 3/1999 | Medal | 411/82 |
| 6,485,240 | B2 | * | 11/2002 | Stumpf et al. | 411/171 |
| 6,488,458 | B2 | * | 12/2002 | Ninomiya et al. | 411/172 |
| 2004/0168375 | A1 | * | 9/2004 | Sack | 52/125.4 |

* cited by examiner

*Primary Examiner* — Flemming Saether
(74) *Attorney, Agent, or Firm* — Blank Rome LLP

(57) ABSTRACT

The present invention relates to an insert comprising a tubular plastic body having a hollow, axially extending threaded interior, and a plurality substantially parallel ribs extending radially outward from the plastic body and along the majority of the length of the insert. The insert is capable of threadable engagement with a threaded fastener, such as a crew, to attach a base to a component.

15 Claims, 5 Drawing Sheets

PLASTIC THREADED INSERT

FIELD OF THE INVENTION

The present invention relates to threaded plastic inserts for fastening a plastic base assembly to a component, and to methods for providing plastic inserts and base assemblies. In particular, the invention relates to the use of a threaded plastic insert interlocked with a base to secure a component to the base with a threaded fastener.

BACKGROUND OF THE INVENTION

Molded plastic parts have becoming increasingly popular, due at least in significant part to their low production cost, good chemical resistant properties, high strength, and heat resistance. Hence, often, one or more components of an assembly are formed of molded plastic. In assembling a final product it is often necessary to fasten the molded plastic parts to other components to produce the final product. Many plastic parts are molded of acrylic, polycarbonate or other similar material due to their high strength. However, such materials also have low ductility, and it is often desirable to screw a threaded member or fastener into a molded plastic part to fasten another component thereto.

Current production methods for fastening components to a plastic part include forming a threaded recess in the plastic part, which serves as a base, and into which a threaded member or fastener is screwed. This has been found to be undesirable in several respects. The brittle nature of the plastic employed makes it difficult to cut threads in the acrylic base for receiving the threaded member. During molding of the plastic part, strength is obtained from a hardened "skin;" however, this hardened "skin" is broken when a thread is cut into the plastic. As such, during thread formation, the plastic base material has been found to crack and chip, often making insertion of the threaded fastener difficult or impossible. Also, the chipping reduces the bearing surface area against which the threads of the fastener bear against the base to preclude the fastener from being pulled out of the base. Thus, the load bearing capacity of the threaded member is significantly reduced.

Due to the aforementioned difficulties associated with prethreading brittle plastic base materials, other, less desirable, fastening means have been employed. One such alternative fastening means attempted has been to employ a self-threading screw. However, the brittle nature of the plastic base material precludes the formation of a consistent thread therein, with a resultant cracking of the base.

Alternatively, internally threaded metal inserts have been molded to the base, with a threaded fastener then screwed into the internal threads of the metal insert. The formation of the metal inserts adds considerable expense to the overall production cost. Additionally, because metals are generally much stronger than plastic, the use of metal inserts is overkill as the pull strength of the metal is much higher than that required for plastic devices and the base plastic generally will break before the metal insert upon application of a sufficient pulling force.

One method currently employed for fastening components to the base which provides the desired bonding strength is a conventional screw and nut assembly. However, this is undesirable in several respects. Functionally, the screw and nut assembly loosens over time, resulting in a loose connection between components. Also, aesthetically, screw and nut assemblies are undesirable due to the requirement of a provision for accommodating the nut or the nut being exposed on one end of the base, rather than allowing for employment of a blind tapping which provides superior aesthetics. Furthermore, the requirement of the metal nut adds cost to production and is difficult to automate.

U.S. Pat. Nos. 5,222,850 and 5,391,031, both to Medal, disclose a plastic insert having a plurality of wedge shaped protrusions on the outer wall of the insert. The protrusions are melted after inserting into a plastic base to blend with the plastic immediately surrounding the insert to form a bond with the base. Because of the shape and location of the protrusions, complicated molds must be designed to accommodate the undercut between the protrusions along the length of the insert. Additionally, both the plastic and the base material must be melted to effect proper bonding to the insert and base material.

There is a need for a fastener and method of fastening components to a plastic base material which provides a good, secure connection capable of withstanding significant separating forces without added complication of bonding the insert to the base material. The fastener should also lend itself to low production cost and provide a reusable thread for disassembly and assembly without compromising joint strength.

SUMMARY OF THE INVENTION

The present invention provides plastic molded inserts having internal threads for engaging with a threaded fastener, such as a screw, and external ribs extending substantially parallel to each other along a majority of the length of the insert. The plastic insert is capable of being inserted in a base material, preferably plastic, to hold the base material to a component with the fastener. The nature of the plastic provides for the facile formation of internal threads in the insert during molding, and provides for rigid ribs on the outer surface of the insert that do not flow with the less ductile plastic of the base material upon being subjected to ultrasound or the like. Preferably, during ultrasonic insertion only the plastic of the base flows into the spaces or recesses around the ribs on the outer surface of the insert to form a lock between the base and the plastic insert preventing rotation and axial movement of the insert relative to the base. Thereafter, a threaded fastener may be screwed through an aperture in a component and threadably received in the insert to attach the component to the base.

More particularly, a plastic cylindrical shaped insert is provided having a threaded hollow interior and having a plurality of ribs extending radially outward from its exterior wall and extending from the bottom toward the top of the cylinder along a majority of the length of the cylinder. A cylindrical recess is formed in the base material, the diameter of which corresponds to the outer diameter (not including the rib protrusion) of the insert. The insert is initially pressed into the recess, using for example ultrasound, with the ribs cutting into the base material that has been rendered flowable by the ultrasound (the ribs of the insert remain solid). During the process, the plastic of the base in areas adjacent to the insert is brought to a flowable state, whereby the base material flows and meld to conform around the ribs, and thereafter cool and solidify to integrally bond the insert to the base. The insert and the internal threading of the insert remains intact during the ultrasonic insertion of the insert to the base; and a threaded fastener such as a screw may then be screwed directly into the threaded interior of the insert.

In accordance with one embodiment of the invention, the insert has a filler of glass, metal, or the like to provide improved strength. During molding of the insert, the filler material flows preferably to regions about the threads or the ribs to provide greater strength in these areas.

In accordance with a preferred aspect of the invention, the bottom of the insert is provided with ribs that start flush with the lower end of the insert and terminate just short of the upper end of the insert. In this embodiment, the flow and subsequent solidification of the base material over the top edge (shoulder) of the ribs holds the insert in place and prevents axial movement of the insert relative to the base, while the flow of the base material between the ribs prevents rotational movement (around the axis) of the insert relative to the base. This design allows for an insert having no undercut that can be molded using a simple mold and can be ejected directly from the mold without complicated mold design or movement.

In another aspect of the present invention, the insert contains a blind hole where the thread in the hole terminates at the bottom of the blind hole. This is not possible in a metal insert where the thread ends at a distance from the blind hole because the tip of the tap that is used to thread the metal insert is not threaded and cannot effect threading to the bottom of the blind hole.

The plastic insert of the present invention lends itself to economical and automated manufacture by conventional molding (thermoset and thermoplastic); and the method for carrying out its implementation is also low cost in comparison to alternative fastening methods.

BRIEF DESCRIPTION OF THE DRAWINGS

The foregoing background and summary, as well as the following detailed description of the preferred embodiment, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE PREFERRED EMBODIMENT

Figure 1:
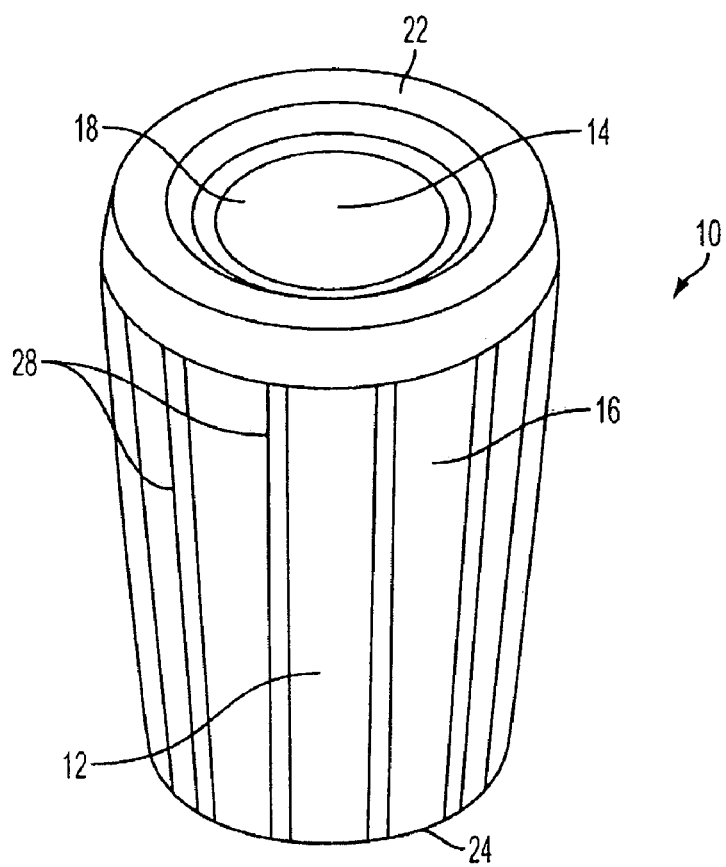
FIG. 1 shows a plan view of an plastic insert.
Figure 2:
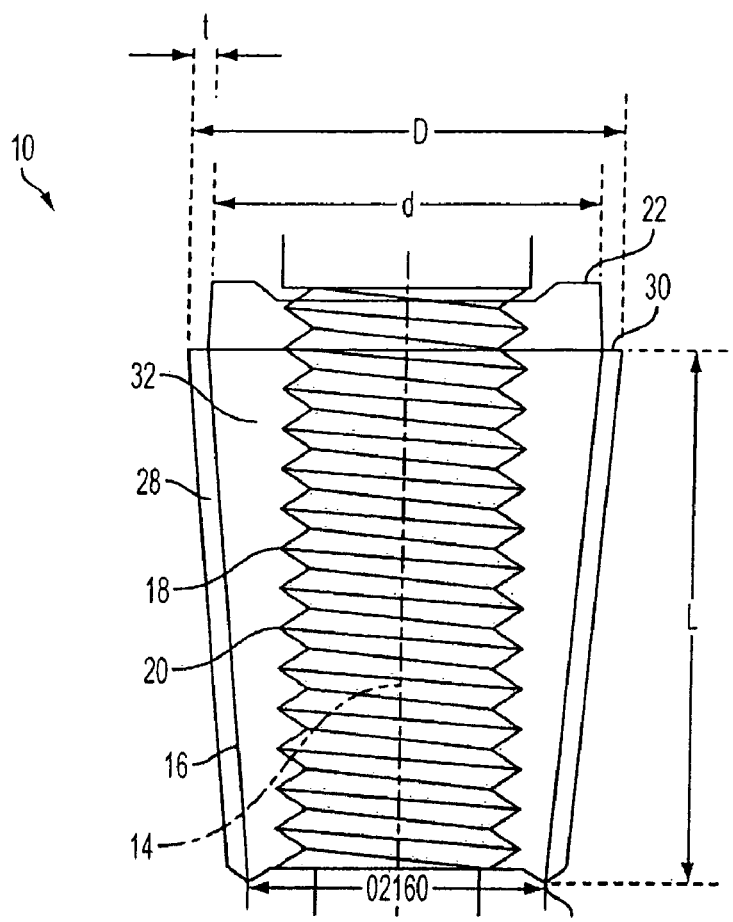
FIG. 2 shows a vertical cross-section of a plastic insert.
Figure 3:
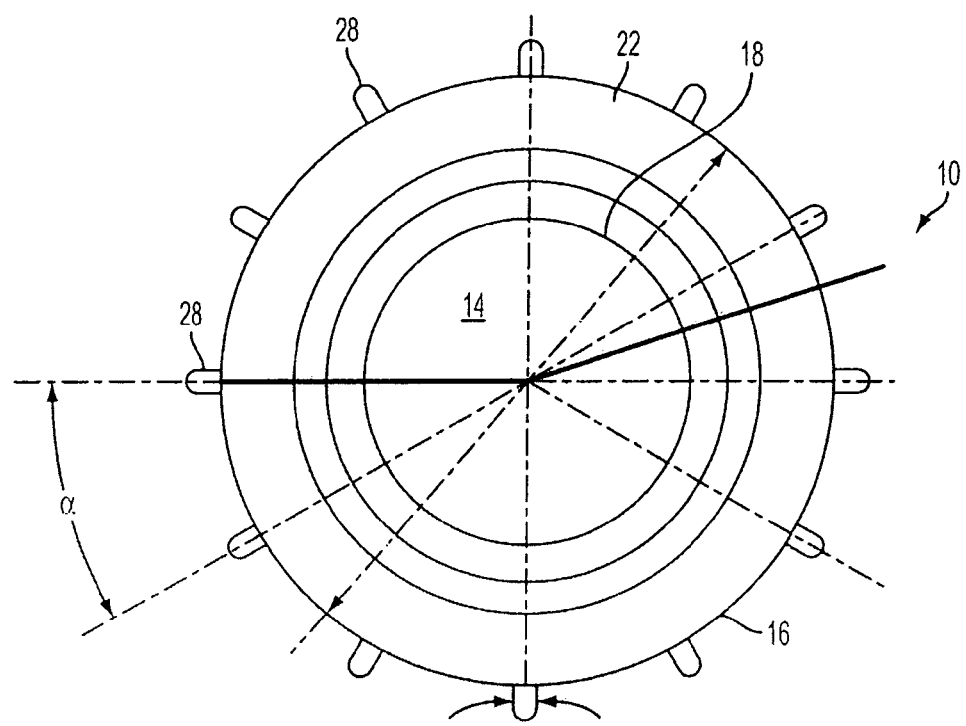
FIG. 3 shows a top view of a plastic insert.

An insert embodying various features of the present invention is illustrated in the drawings (FIGS. 1-4) and referred to generally by reference numeral 10. The insert 10 is preferably formed of plastic, and preferably by conventional molding methods, that preferably can withstand pulling for of greater than 20 pounds, more preferably greater than 100 pounds; and most preferably greater than 700 pounds.

The insert 10 comprises a body 12 formed into the approximate shape of a circular cylinder and having an axially extending hollow interior bore or passageway 14 therethrough. The body 12 defines an exterior surface 16 and interior surface 18. The interior surface 18 has threads 20 thereon, preferably extending the length of the body 12 from its upper end 22 to its lower end 24. The internal threads 20 of the insert 10 are formed to correspond to the threads of a threaded fastener, such as a screw, to allow the threaded fastener to be screwed into the insert 10 and be threadably engage therewith.

Figure 4:
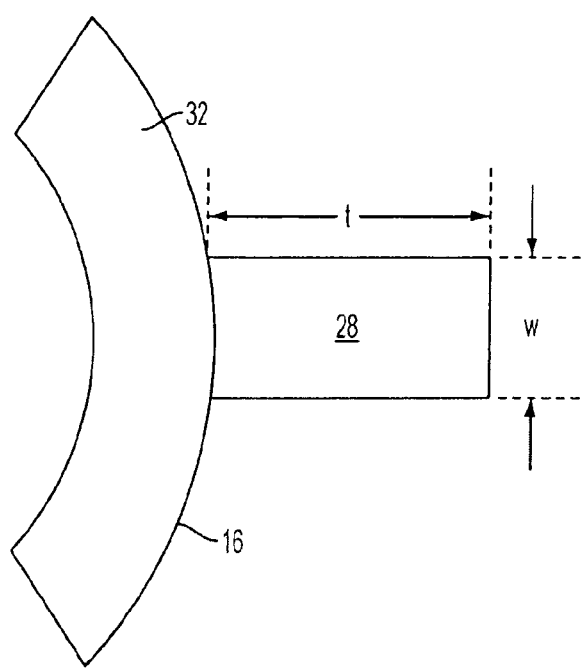
FIG. 4 shows a close up view of a rib.
Figure 5:
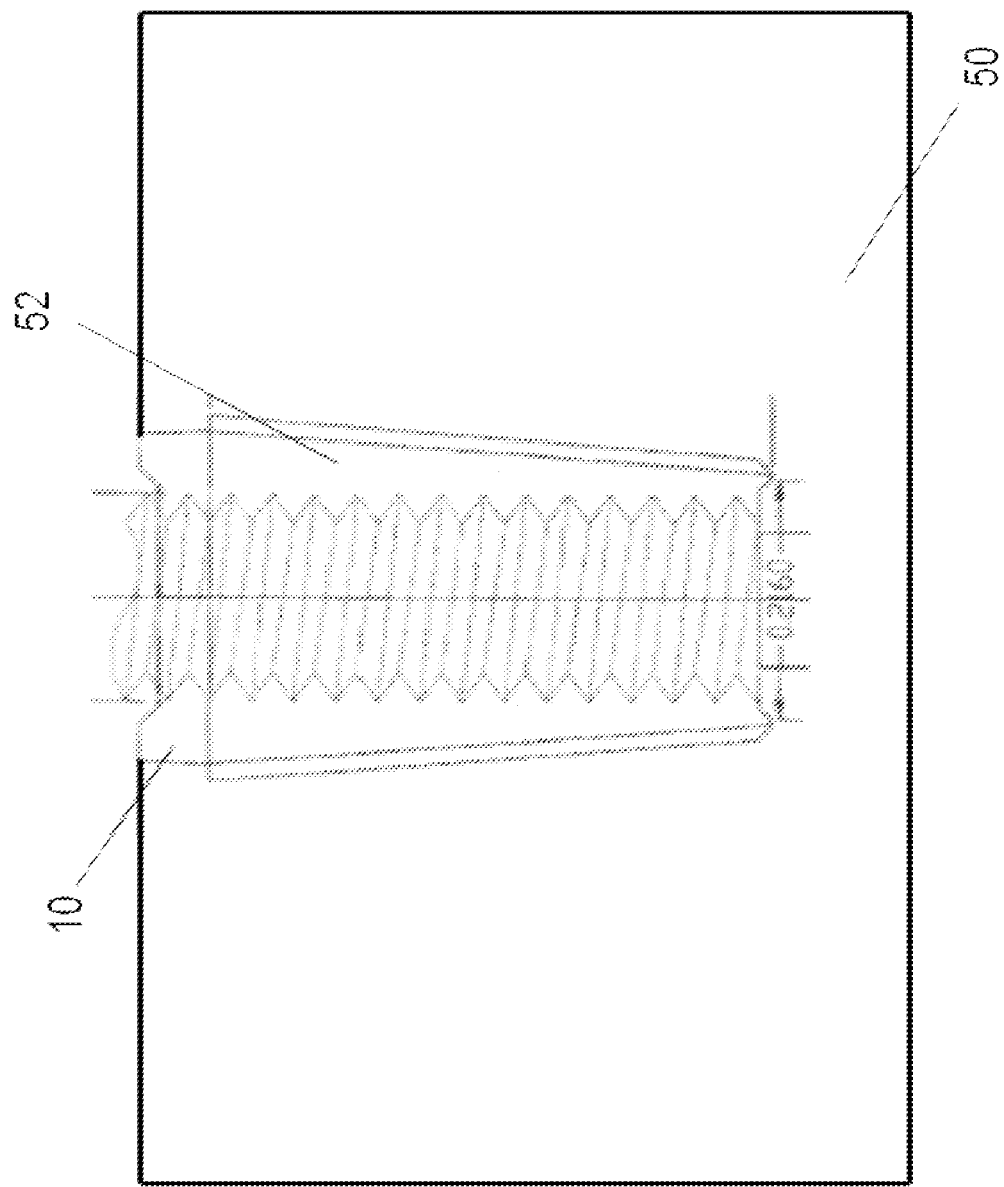
FIG. 5 shows the plastic insert being inserted in a base.

The exterior surface 16 of the insert 10 contains a plurality of ribs 28 which are formed integral with the insert body 12 and extend radially outward from the exterior surface 16 of the insert 10. The ribs 28 preferably have a substantially rectangular or square cross-section as shown in FIG. 4. Although, a rectangular or square cross-section is preferred for the ribs, other cross-sections are also applicable for the present invention. Preferably, the rectangular or square cross-section of the rib 28 has rounded edges for ease of ejection from the mold. In certain embodiment, a v-shape cross-section may also be appropriate, for ease of insertion into the base. Contrary to the protrusions of U.S. Pat. Nos. 5,391,031 and 5,222,850, the ribs of the present invention do not require an undercut because it is not align in vertical rows spaced by vertical spaces or gaps from one another within a row. The ribs 28 of the present invention is such that, along a vertical row on the outer exterior surface 16, there is only one rib. In this case, there is no undercut.

Preferably, the ribs are substantially parallel to each other along the exterior surface 16 of the insert 10 extending from the lower end 24 toward the upper end 22 along a majority of the length L of the insert. Preferably, the ribs extends 51-100% of length L, more preferably 60-99%, and most preferably 70-95%.

In an preferred embodiment, the ribs 28 are flush with the lower end 24 and stop short of the upper end 22 forming a shoulder 30. In certain embodiments of the present invention, the exterior surface 16 of the insert 10 is tapered where the diameter at the lower end 24 is smaller than the diameter at the upper end 22. This configuration is advantageous for use with automated processes for aligning the insert 10 with the receiving hole in the base using vibrating feeders. The tapered insert is also easier to remove from the mold due to its shape where the upper end 22 is smaller than the lower end 24. Preferably, the insert is tapered at greater than about 0.5° along the length L of the insert, more preferably about 0.5° to 2.3°/inch, most preferably about 1.0° to 1.5°/inch, which allows for proper function and advantages of the tapered insert without excessively thinning the wall 32 of the insert at the lower end 24.

In another embodiment, the insert 10, is tapered at both ends. In this case, the insert 10 has the widest diameter at its middle and tapers towards both the lower end 24 and the top end 22. This provides a symmetrical insert that can be loaded into the base material without having to be concerned with orientation.

The ribs 28 preferably extend radially from exterior surface 16 of the insert 10. The rib dimension generally depends on the size of the insert and the plastic of the base material. The distance from the exterior surface 16 that the rib 28 extends is referred to herein as the thickness t of the rib 28. As such, the insert 10 has an inner diameter ID, a first outer diameter d that is the twice the distance between the center of the insert 10 and the exterior surface 16 (see FIG. 2); and second outer diameter D that is twice the distance between the center of the insert 10 and end of the rib 28 (D=d+t) (see FIG. 2). The thickness t of the rib 28 is preferably the smallest required to effect a particular holding power. Preferably, this thickness t is a function of the wall thickness T (T=d−ID) of the insert 10. Typically, the thickness t of the rib 28 is less than about 3T times the nominal wall thickness T, preferably about ½T to about ⅔T. The width w of the rib 28 is also an important parameter is the design of the insert 10. The width w should be sufficient to resist rotational movement about the axis of the insert 10 when the insert is properly inserted in a base. This width w is preferably the same as the thickness t of the rib 28. Additionally, the spacing of the ribs 28 is also important in the design of the insert. A rib 28 is spaced from its closest rib 28 by an angle α which is preferably about 6 to 120°, preferably about 20 to 40°, most preferably about 30°. The angle α can also be dependent of size, as a small insert has a higher angle α, and a larger insert has a smaller angle α. The number of ribs on an insert 28 can be approximated by the following formula:

$$N=\pi d/2w,$$

where N is the number of ribs, d is the first outer diameter, and w is the width of the rib.

In another embodiment of the invention, the rib 28 may also have a taper along the length of the insert 10, where the thickness t of the rib 28 is greater toward the upper end 22 than the lower end 24. This effectively provides a tapered insert 10, without having the disadvantage of varying wall thickness along the length of the insert 10. Preferably, the taper of the rib is about 0.5° to 0.25°/inch along the length L of the insert.

In another embodiment of the invention, the threaded interior surface 18 forms a blind hole at the lower end 24. In this configuration, the lower end is closed so that the only opening in the insert 10 is at the upper end 22. This opening is where a threaded fastener screws into the insert 10. By making the blind hole insert out of molded plastic, it is possible to have the thread in the interior surface 18 of the insert 10 end at the bottom of the blind hole. This is not possible with metal inserts where the thread ends at a distance from the bottom of the blind hole because the tip of the tap that is used to thread the metal insert is not threaded and cannot effect threading all the way to the bottom of the blind hole.

The insert is preferably made of plastic, including thermoset plastic or thermoplastic. The preferred thermoplastic includes, but are not limited to, polyketones (PEEK), polyethersulfone, as made by Solvay, GE, Victrex, Oxford and other manufacturers of high temperature engineering resins. The preferred thermoset plastics are phonolic plastic and polyester, as made by Plenco, Sumitomo, Bulk Molding Compounds, and Cayuga.

In accordance with one aspect of the invention, the insert plastic may include a filler, such as glass, metal, graphite, nanoclay, cabon nanotubes, molybdenum disulfide, hydrogenated nitrile rubber (HNBR), or the like, to further improve physical properties, such as strength, reduction of brittleness and added flexibility. In a preferred embodiment, the filler provides increased strength to the thread and ribs of the insert to provide increased pull and rotational strength. HNBR, on the other hand, can reduce brittleness and add flexibility to the plastic. Additionally, these precision molded threads have self-locking qualities due to the fiber glass filler content of the insert plastic. In this case, the glass close to the surface of the threads provides "gripping" properties to lock the treads of the screw and the insert together. Additionally, because of the strength provided by the filler, the threads of the insert can be made a fraction smaller in diameter for greater holding power.

The base 50 preferably includes a cylindrical recess 52, preferably having a diameter equal to or slightly larger than the first outer diameter d of the insert 10, but smaller than the second outer diameter D of the insert 10. Preferably, the insert 10 is inserted in to the recess 52 in the base using ultrasonic insertion. This process involves applying ultrasonic energy, preferably a thousands of cycles per second, to push the insert 10 into the recess of the base. During this process, the vibration causes the base material adjacent to the insert 10 to melt and allows the ribs 28 to cut into the base material, while the base material flows to conform to the shape of the ribs 28. For this to occur, it must be noted that only the base material melts while the plastic of the insert 10, including the ribs 28, remains solid.

In the embodiment where the ribs 28 are designed with shoulders 30, the shoulder is pressed into the base such that the base material flows over the top to the shoulder 30 to better retain the insert 10 and to resist axial movement of the insert 10.

Preferably the insert 10 is pressed into the base 50 so that the upper end 22 is flushed with the adjacent surface of the base. Once the insert 10 is fully inserted into the base 50, the interior threading 20 of the insert 10 provides a site for threaded engagement with a threaded fastener. To attach a component, which may be a metal, plastic, or any other material, to the base having an insert therein, the threaded fastener is passed through an aperture in the component and screwed into the interior threading 20 of the insert 10. The component is thus secured to the base by the threaded engagement between the insert and the fastener.

The base material is generally a plastic, preferably a thermoplastic. It is preferable that the base plastic and the insert plastic have different heat deflection temperature (HDT). The HDT of the base plastic is preferably about 50 to 100° F. less than the HDT of the insert plastic, more preferably about 80 to 100° F. less, and most preferably about 100° F. less. These parameter is most desirable for ultrasonic insertion so that only the base plastic melts while the insert plastic remains solid during the insertion of the insert 10 into the base.

Although the present invention is best used with ultrasonic insertion, other insertion processes are also appropriate, including molded-in and press-in insertion. In the molded-in process, the insert in placed in a mold, manually or robtically, and the base is molded around the insert. With press-in insertion, the insert is physically pressed into a cylindrical recess without the assistance of ultrasonic energy or heat application.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A threaded insert for insertion into a plastic base comprising:
   a hollow tubular plastic body defining an interior wall, an exterior wall, a top side and a bottom side;
   said interior wall being threaded;
   said exterior wall having a plurality of plastic ribs extending radially outward from the exterior wall and extending the majority of the length of the plastic body, wherein the heat deflection temperature (HDT) of the plastic material of the threaded insert is about 50 to about 100° F. greater than the HDT of the plastic material of the base.

2. The threaded insert of claim 1, wherein the plastic is selected from the group consisting of thermoset plastic and thermoplastic.

3. The threaded insert of claim 1, wherein the exterior wall is tapered from the top side to the bottom side such that the outer diameter of the insert at the top side is greater than the outer diameter of the bottom side.

4. The threaded insert of claim 3, wherein the taper is about 0.5 to about 2.3° along the length of the outer wall.

5. The threaded insert of claim 1, wherein the bottom side is closed to form a blind hole and the thread on the interior wall ends at the bottom of the blind hole.

6. The threaded insert of claim 1, wherein the plastic contains a filler.

7. The threaded insert of claim 6, wherein the filler material is glass fiber, clay, or nanotubes.

8. The threaded insert of claim 1, wherein the pull strength of the thread is greater than about 20 pounds.

9. The threaded insert of claim 1, wherein the pull strength of the thread is greater than about 100 pounds.

10. An assembly comprising
the threaded insert of claim 1;
the plastic base having a recess therein, wherein the threaded insert is inserted in the recess; and
a threaded fastening member threadably engaging with the threaded interior wall of the threaded insert and holding the base and a component and the base together.

11. The assembly of claim 10, wherein the plastic material of the insert has greater strength that the plastic material of the base.

12. The assembly of claim 10, wherein the threaded insert is inserted into the recess using ultrasonic insertion.

13. The assembly of claim 10, wherein the threaded fastening member is a screw.

14. A method for inserting a threaded insert into a recess in a plastic base, said threaded insert comprising
a hollow tubular plastic body defining an interior wall, an exterior wall, a top side and a bottom side;
said interior wall being threaded;
said exterior wall having a plurality of plastic ribs extending radially outward from the exterior wall and extending the majority of the length of the plastic body, wherein the heat deflection temperature (HDT) of the plastic material of the threaded insert is about 50 to about 100° F. greater than the HDT of the plastic material of the base;
said method comprising the step of inserting the threaded insert into the recess while applying sufficient ultrasonic energy to allow the material of the plastic base immediately surrounding the recess to deform upon insertion of the threaded insert, but without deforming the ribs of the threaded insert.

15. The method of claim 14, wherein the plastic material of the insert has greater strength that the plastic material of the base.

* * * * *